INVENTORS
KARL GÖSTA HERBERT LINDBERG
BERNHARD PERSON
JARL MORANNAR THORSÉN
BY Hane and Nydick
ATTORNEYS INVENTORS
KARL GÖSTA HERBERT LINDBERG
BERNHARD PERSON
JARL MORANNAR THORSÉN
BY Hane and Nydick
ATTORNEYS INVENTORS
KARL GÖSTA HERBERT LINDBERG
BERNHARD PERSON
JARL MORANNAR THORSEN
BY Hane and Nydick
ATTORNEYS INVENTORS
KARL GÖSTA HERBERT LINDBERG
BERNHARD PERSON
JARL MORANNAR THORSÉN
BY Hane and Nydick
ATTORNEYS INVENTORS
KARL GÖSTA HERBERT LINDBERG
BERNHARD PERSON
JARL MORANNAR THORSÉN
BY Hane and Nydick
ATTORNEYS INVENTORS
KARL GÖSTA HERBERT LINDBERG
BERNHARD PERSON
JARL MORANNAR THORSÉN
BY Hane and Nydick
ATTORNEYS

United States Patent Office 3,005,051

Patented Oct. 17, 1961

3,005,051

NOISE ELIMINATION IN MULTIPLEX TRANSMISSION SYSTEMS WORKING ACCORDING TO THE TIME DIVISION PRINCIPLE

Karl Gösta Herbert Lindberg, Linkoping, Lars Bernhard Person, Stockholm, and Jarl Morannar Thorsén, Hagersten, Sweden, assignors to Telefonaktiebolaget L M Ericsson, Stockholm, Sweden, a corporation of Sweden Filed Jan. 22, 1957, Ser. No. 635,243
Claims priority, application Sweden Jan. 24, 1956
5 Claims. (Cl. 179—15)

This invention relates to multiplex transmission systems based upon the time division principle and the main object of the invention is to provide an improved device for suppressing or eliminating noise, particularly low frequency noise, e.g. cross-talk.

In such systems it is necessary to work with a very wide band. In radio links this is achieved rather easily but if the transmission medium is a coaxial tube the bandwidth will be restricted both upwards and downwards in frequency. Owing to this the pulses will be distorted, so that one pulse does not disappear completely before the next pulse appears and thereby cross-talk will occur in one or more succeeding channels.

A device for eliminating cross-talk occuring in the above mentioned manner is described in the Swedish Patent No. 128,637. According to this patent the transmitted channel pulse series are delayed as long a time as corresponds to the time space between two adjacent channel pulses pertaining to different channels. The time delayed pulse series is inverted, attenuated and is then added to the original pulse series. By adjusting the attenuation accurately the cross-talk to the next succeeding channel may be eliminated. If, however, the lower frequency range of the transmission medium is terminated, there will occur cross-talk in a large number of succeeding channels. In such a case the device according to said patent will be extremely complicated.

According to this invention it is possible to eliminate, in a rather simple way, such cross-talk as well as other low frequency disturbances. The invention resides in a device in multiplex transmission systems, in which the messages of the particular channels are transmitted in the form of modulated pulse series interlaced with each other in time, for the elimination of noise of rather low frequency, e.g. cross-talk, and the invention is mainly characterized by a storage circuit recharged by the current or voltage existing immediately before each channel pulse in the combined pulse series, which current or voltage is maintained during a time interval which is small in relation to the interval between two adjacent channel pulses pertaining to different channels, and by a device subtracting said stored current or voltage from the combined channel pulse series.

Figure 1:
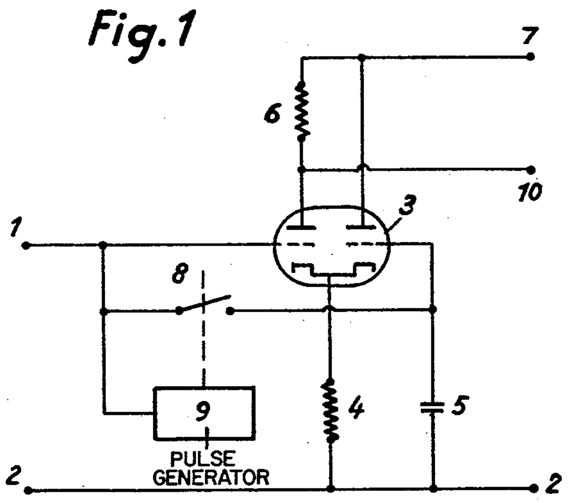
Figure 2:
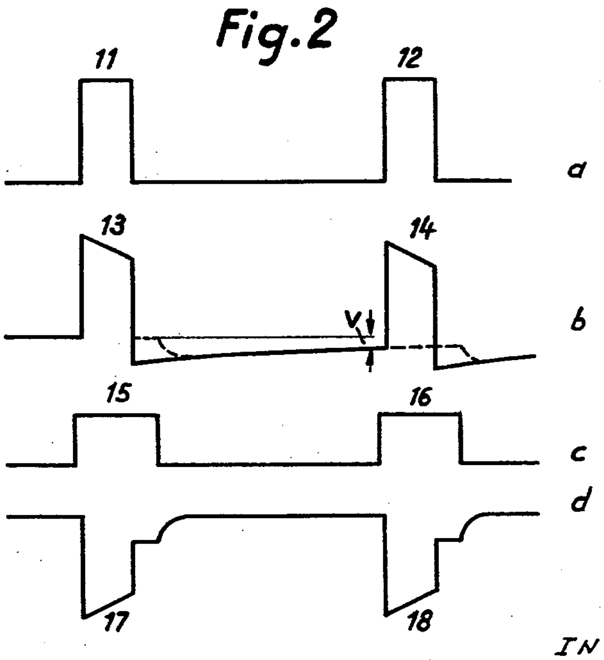
Figure 3:
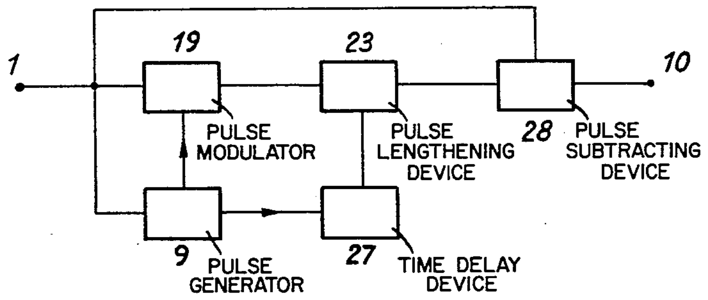
Figure 4:
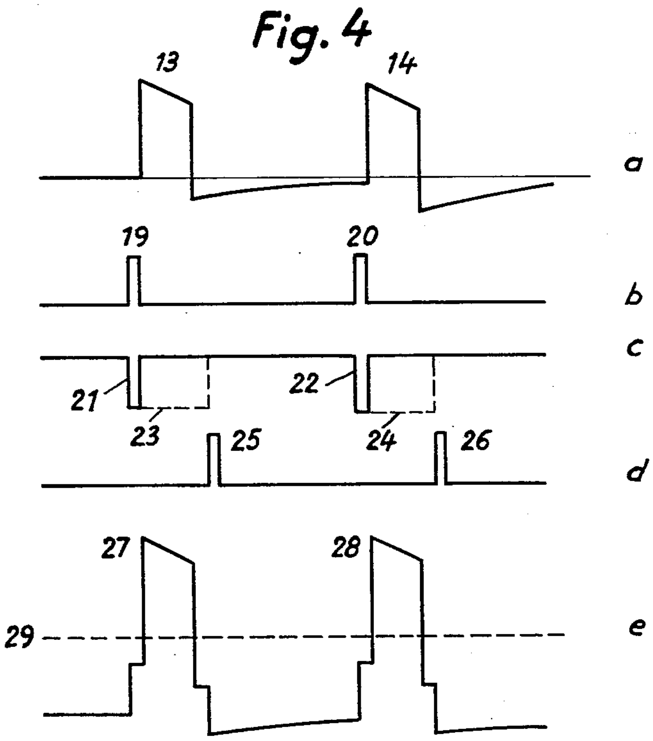
Figure 5:
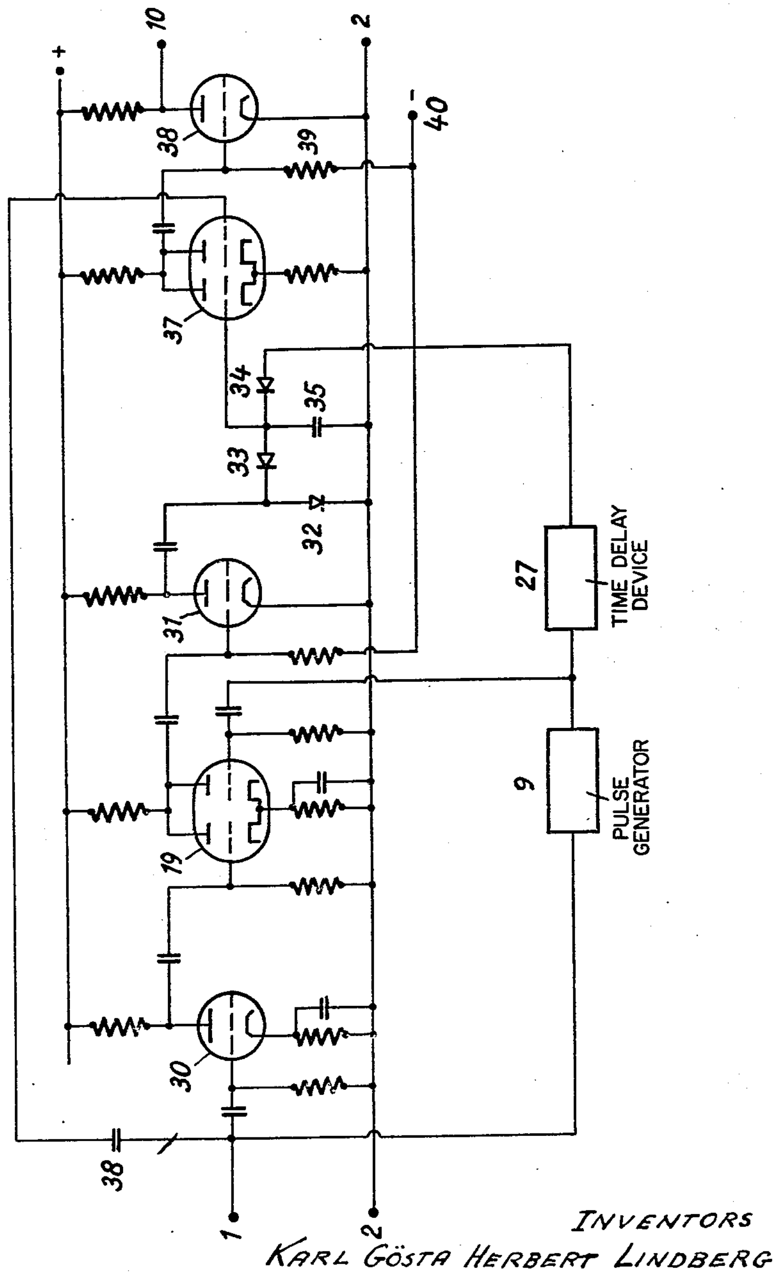
Figure 6:
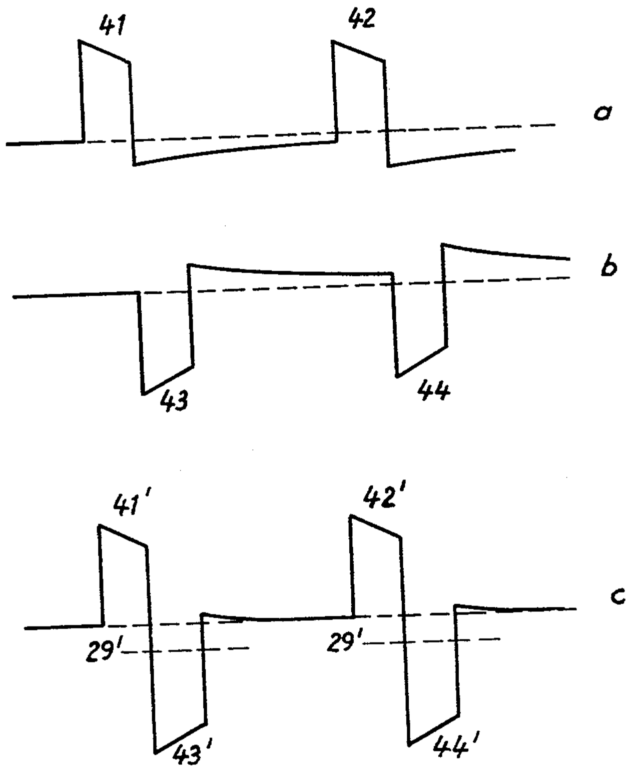
Figure 7:
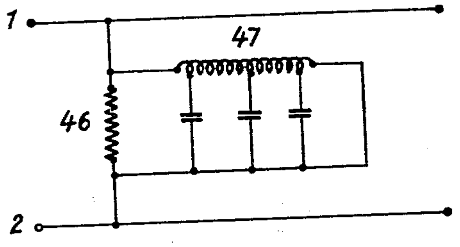
Figure 8:
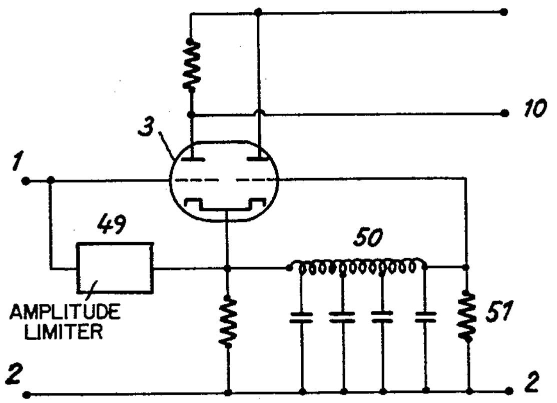
Figure 9:
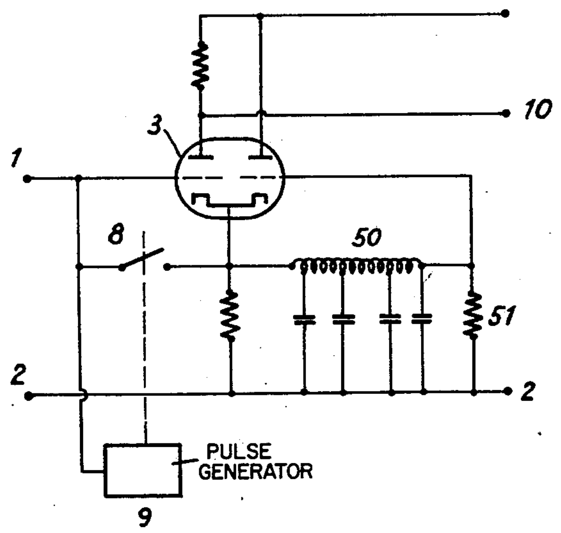
Figures 10, 11, 13:
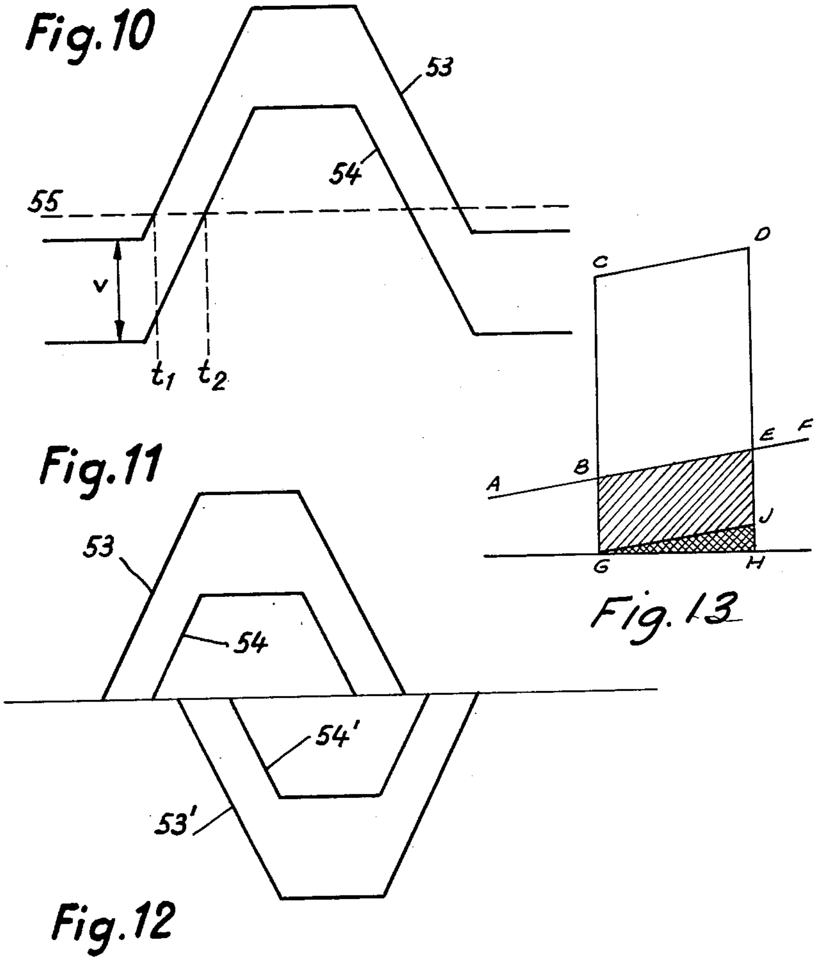
Figure 12:
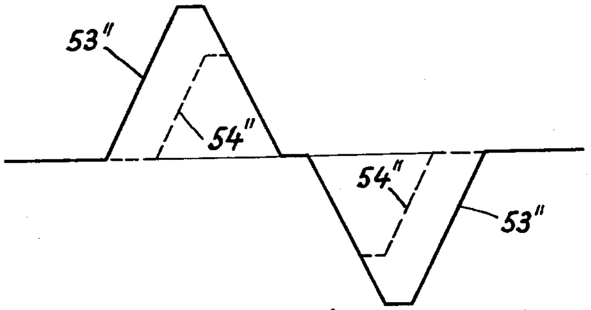

The invention will now be described more in detail with reference to the annexed drawings, in which FIG. 1 shows a device according to the invention, FIG. 2 shows a pulse diagram in connection with the device according to FIG. 1, FIG. 3 shows a modified embodiment according to the invention, FIG. 4 shows a pulse time diagram according to FIG. 3, FIG. 5 shows the device according to FIG. 3 in detail, FIG. 6 shows a pulse time diagram in connection with the device according to FIG. 7, FIG. 7 shows another embodiment according to the invention, FIGS. 8 and 9 show two embodiments of the invention in connection with the device according to FIG. 7 and the pulse time diagram according to FIG. 6, FIG. 10 shows how an amplitude modulation, which is superimposed on the base-line of the pulse series, may cause cross-talk at time position modulation, FIGS. 11 and 12 show diagrammatically how such cross-talk may be eliminated by means of the present invention, FIG. 13 shows a diagram, which more closely indicates the principle of noise elimination according to the invention, In FIG. 1 the input terminals of the device are indicated by 1 and 2. The input terminal 1 is connected to the left control grid in an electron tube 3. This tube is a double triode and has its cathodes interconnected and grounded via a resistance 4. The right control grid of the tube 3 is connected to a storage circuit consisting of a condenser 5, the second electrode of which is grounded. The left anode of the tube 3 is via an anode resistance 6 connected to a positive voltage source 7, to which, furthermore, the right anode of the tube is directly connected. A switch 8, which is suitably an electronic switch, e.g. a diode bridge, is connected between the input terminal 1 and the right control grid of the tube 3. Said input terminal is also connected to a device for controlling the switch 8. This device consists of a generator for break pulses and may, for example, be a device, which selects the synchronizing pulse of the multi-channel pulse series, thus generating thereof a pulse series having the same pulse repeating frequency as the repeating frequency of the total, stored channel pulse series. If the transmitted channel pulse series are amplitude modulated, the pulse generator 9 may consist of an amplifier which amplifies the incoming pulse series and terminates the pulse amplitude so that the modulation of the pulses will disappear. Out of the unmodulated pulses thus obtained there is generated a pulse series, the pulses of which have a suitable time position and a suitable duration and these pulses may then control the switch 8. The output terminals of the device are indicated by 10 and 2.

FIG. 2 shows a pulse diagram in connection with the device described above, FIG. 2*a* showing two channel pulses 11 and 12 respectively, transmitted from the receiver side and pertaining to different channels. FIG. 2*b* shows how these pulses have been distorted after the transmission, the channel pulses obtained on the receiver side being indicated by 13 and 14, respectively. If the bandwidth of the transmission medium is restricted downwards in frequency, the pulse peaks will slope according to the figure. If the pulses are positive, a negative voltage will be obtained, when the pulses cease to appear, and this voltage may last several pulse intervals. Thus, when the pulse 14 appears, there is left a remaining potential $v$ from the preceding pulse. This remaining potential produces cross-talk from the pulse 13 to the pulse 14. The channel pulse train thus received according to FIG. 2*b* is now fed to the input terminals 1 and 2 in a device according to FIG. 1. When the switch 8 is closed, the voltage fed to the device will be supplied to the two control grids of the tube 3, this tube being coupled as a differential amplifier. Owing to this there will arise a voltage at the output terminals 10 and 2 of the device, said voltage corresponding to the difference between the voltages fed to the different control grids of the tube, and therefore the output voltage of the switch 8 will be zero in this position. Immediately before the channel pulse 14 appears, the pulse generator 9 generates a control pulse 16 (FIG. 2*c*), which opens the switch 8. Thus, the voltage on the two grids of the tube will be equal to $v$ and the condenser 5 will maintain this voltage on the right control grid of the tube during the whole time when the switch 8 is open, i.e. during the whole duration of the pulse 16. When the channel pulse appears on the left control grid of the tube, this pulse will be transmitted to the output of the device, the voltage *v*, remaining on the right control grid of the tube, however being subtracted therefrom. From the channel pulse obtained at the output of the device there has thus been subtracted the noise voltage *v*, which otherwise would have caused the cross-talk. At the end of the pulse 16 the switch 8 is again closed. Thus the voltage over the condenser 5, i.e. the voltage on the right control grid of the tube, will follow the voltage on the left control grid of the tube, the same thing occurring for all other channel pulses. The device shown in FIG. 1 has thus considerably reduced the cross-talk between the channel pulses and FIG. 2*d* shows the voltage received at the output terminals of the device.

FIG. 3 shows a block diagram of another embodiment according to the invention, to the input of which there is fed a combined pulse series e.g. the pulses 13 and 14 pertaining to different channels. This pulse series is also fed as modulation voltage to the pulse modulator 19 to which also gate pulse series 19 and 20 (according to FIG. 4*b*) are fed from a pulse generator 9. These gate pulse series appear immediately before the corresponding channel pulses 13 and 14, respectively. At the output of the modulator 19 pulses 21 and 22, respectively, are obtained, the amplitude of which is modulated and depends on the amplitude of the voltage, see FIG. 4*a*, existing immediately before the respective channel pulses. The pulses 21 and 22 thus obtained, which are amplitude modulated by noise and cross-talk voltages, are then fed to a pulse lengthening device 23 which lengthens the duration of the pulses while maintaining the amplitude modulation. Thus pulses 23 and 24 are obtained, the trailing edges of which are supposed to be determined by pulses 25 and 26, see FIG. 4*d*, obtained from the pulse generator 9 via a time delay device 27. These lengthened pulses 23 and 24 are thus amplitude modulated by cross-talk voltages and other noise voltages which according to FIG. 4*a* may occur immediately before the channel pulses 13 and 14. The pulses 23 and 24 are fed to a device 28 which substracts the same from the channel pulses according to FIG. 4*a*. At the output 10 of the device there is thus obtained a voltage according to FIG. 4*e* constituting the difference between the voltages according to FIGS. 4*a* and 4*c*. The pulses 27 and 28 obtained at the output of the device thus obtain an amplitude which is independent of the noise voltages occurring immediately before the respective channel pulses 13 and 14 and accordingly also independent of the noise voltages occurring during the channel pulses proper, if the frequency of the noise is low. The pulses according to FIG. 4*e* may then be fed to a device (not shown in FIG. 3) which admits only that portion of the respective pulse which exceeds a certain level, e.g. 29 in FIG. 4*e*. In this manner the device according to FIG. 3 may in the same manner as the device according to FIG. 1 effectively eliminate the cross-talk which is already present.

FIG. 5 shows the device according to FIG. 3 more in detail. 1 and 2 again indicate the input terminals of the device and 10 and 2 again indicate the output terminals of the device. To these input terminals there is fed the incoming channel pulse series, the pulses being supposed to be negative. These amplitude modulated pulses are inverted in an amplifier stage 30 and fed to the left control grid in a pulse modulator 19 consisting of a double triode. The right control grid of the tube 19 is fed with gate pulses from a pulse generator 9, these gate pulses appearing immediately before the respective channel pulses. At the two interconnected anodes of the tube 19 there are obtained pulses 21 and 22 according to FIG. 4*c*, said pulses being modulated by noise voltages. These pulses are fed via a buffer amplifier stage 31 to a pulse lengthening device consisting of three semi-conductor diodes 32, 33 and 34 and a condenser 35. The anode of the diode 32 and the cathode of the diode 33 are interconnected and via a condenser connected to the anode of the tube 31. The anode of the diode 33 is connected to the cathode of the diode 34 and connected to one electrode of the condenser 35, the second electrode of said condenser being grounded. The anode of the diode 34 is connected via a delay network 27 to the pulse generator 9. The pulses 21 and 22 obtained from the anode in the tube 31, which pulses have a negative polarity and are amplitude modulated by noise voltages, recharge via the diode 33 the condenser 35 to a voltage which is dependent on the amplitude of the respective pulses. From the delay network 27 there are obtained pulses 25 and 27 having a positive polarity, see FIG. 4*d*, which, when the channel pulses have disappeared, will completely discharge the condenser 35. Through the condenser are thus obtained lengthened pulses 23 and 24 being amplitude modulated by noise voltages according to FIG. 4*c* which pulses then are fed to the left control grid of a tube 37, said tube corresponding to the subtraction device 28 in FIG. 3. The incoming pulse series is fed to the right control grid of the tube 37, see FIG. 4*a*, via a condenser 38, and at the two interconnected anodes of the tube 37 there is then obtained a pulse series according to FIG. 4*e*. This pulse series is then fed to the control grid of a tube 38, said control grid being via a resistance 39 connected to a negative bias source 40 which normally blocks the tube. This tube will thus let pass only those portions of the pulses according to FIG. 4*e*, which exceed a determined level, e.g. 29 in FIG. 4*e*, and at the output terminals 10 and 2 of the device there are in this manner obtained amplitude modulated pulse series between which the cross-talk has been eliminated practically completely.

FIG. 6 shows diagrammatically an application of the invention and FIG. 7 a device which is suitable in connection with the application according to FIG. 6. FIG. 6*a* shows a pulse series consisting of the channel pulse series 41 and 42. As the bandwidth of the transmission medium is restricted downwards in frequency, cross-talk is supposed to have occurred as is shown in the figure. According to the invention the pulses 41 and 42 are now time delayed for a time which in this case corresponds to the pulse width and these time delayed pulses are then inverted, the pulses 43 and 44 thereby being obtained, see FIG. 6*b*. The noise and cross-talk voltages are supposed to have rather a low frequency, i.e. they alter its amplitude inconsiderably during the duration of a channel pulse. If the two pulse series according to FIGS. 6*a* and 6*b* are added, a pulse series according to FIG. 6*c* will be obtained. The last mentioned pulse series consists of a positive pulse 41' immediately followed by a negative pulse 43' and of a positive pulse 42' immediately followed by a negative pulse 44'. The low frequency disturbances appearing immediately before the pulses 41 and 42 have thus been subtracted from said pulses. Thus, the pulses 41' and 42' correspond to the pulses 41 and 42 substantially freed from low frequency disturbances. The necessary time delay is in this case considerably less than the time spacing between two adjacent channel pulses pertaining to different channels, and the shorter the time delay is the better will be the noise elimination. It is suitable to make said time delay equal to the duration of a channel pulse, but in point of noise elimination the time delay may also be made shorter, the energy contents of the pulses 41' and 42', however, then growing smaller. The voltage according to FIG. 6*c* is then suitably fed to a device which only lets pass that portion of the pulses which is located over a determined level.

The device according to FIG. 7 consists of a two-pole connected in parallel to a transmission line, the input terminals of which are indicated by 1 and 2. This two-pole is made of a resistance 46 which is connected between the respective input terminals and between the input terminals of a delay network 47 the output terminals of which are short-circuited, the resistance 46 being adapted to the characteristic impedance of the delay network. A pulse series according to FIG. 6*a* is fed to the input terminals 1 and 2 of the device, is time delayed in the delay network 47, inverted because the output of the delay network is short-circuited and is still more time delayed and then it is refed to the input of the device in the shape of a pulse series according to FIG. 6*b*. Thus the total effective time delay of the delay network will at the most be equal to the duration of one channel pulse.

A delay network passed by amplitude modulated pulses can however cause cross-talk between the different pulse channels. How such a cross-talk may be removed will now be described in connection with the devices in FIGS. 8 and 9. A tube 3 in the form of a double triode is here connected as a differential amplifier. The left control grid of the tube is connected to an input terminal 1 and via an amplitude limiter 49 (FIG. 8) connected to the input side of a delay network 50, the output of which is terminated, undisturbed by reflections, by a resistance 51. The output of the delay network is furthermore connected to the right control grid of the tube 3. The delay network 50 according to this figure should be double as long as the delay network 47 in FIG. 7 as the delay network 50 will be passed by energy in one direction only. The amplitude limiter 49 passes, only those portions of the applied channel pulses which are below a determined level, to the delay network 50. The pulses which are fed to the delay network are thus not amplitude modulated, and the risk that the delay network itself will cause the cross-talk, will be exceedingly small. The pulse series indicated according to FIG. 6*c* will then be obtained at the output terminals 10 and 2 of the device, the amplitude of the pulses 43' and 44' however being terminated so that those portions of these pulses which are below for instance the level 29', will not appear at the output terminals of the device, i.e. the pulses 43' and 44' are unmodulated.

The device according to FIG. 9 corresponds to the device according to FIG. 8 with the difference that the amplitude limiter 49 has been replaced by an electronic switch 8 which is controlled from a pulse generator 9. The device may be so arranged, that the pulses which are fed to the input terminal 1, are amplified and cut many times whereby unmodulated pulses will be obtained. These pulses which appear simultaneously as the corresponding channel pulses, may then block the channel pulses during their whole duration so that they will not be transmitted to the delay network 50. In this case the pulses 43' and 44' have been completely suppressed. By this arrangement practically no cross-talk will be caused by the delay network itself.

This invention may be used for noise elimination not only at transmission of amplitude modulated pulses but also at transmission of pulses modulated in another way. FIG. 10 shows a pulse 53 which is supposed to be time position modulated, a disturbance of rather low frequency with the amplitude $v$ and negative polarity existing on the base line. Thus the pulse 53 will appear at a lower level, see the pulse 54 in FIG. 10. The time position modulated pulse is supposed to affect a detector device at the voltage level 55 achieved by the pulse 53 at the time $t_1$ and by the pulse 54 at the time $t_2$. As a result, the amplitude disturbances which are superimposed on the pulse series may give rise to time disturbances, the time disturbance being the smaller the steeper are the edges of the pulses. Disturbances of this kind may advantageously be eliminated by means of a device according to FIG. 7. The pulses 53 and 54 in FIG. 11 correspond to the pulses in FIG. 10. If the positive pulses according to FIG. 11 are time delayed and inverted, the pulses 53' and 54' will be obtained, a voltage according to FIG. 12 thereby being obtained at superposition of the fed voltage upon the time delayed inverted voltage. Thus the pulses 53 and 53' will produce a voltage 53'' and the pulses 54 and 54' a voltage 54''. The voltage in FIG. 12 will thus occur in the form of a positive pulse followed by a negative pulse, the leading edges of the positive pulse as well as the trailing edges of the negative pulse being still time modulated owing to disturbances. The trailing edges of the positive pulse and the leading edges of the negative pulse will however be independent of time disturbances. The positive pulse may be used, if fed to a demodulation device which is sensitive to the trailing edges of this pulse. It is of course possible to use the negative pulse, if fed to a demodulation device which is sensitive to the leading edges of such pulses.

FIG. 13 shows a diagram which demonstrated in detail the principles of noise elimination according to this invention. The line A—B—C—D—E—F indicates the curve form of an applied voltage. This voltage also comprises a channel pulse B—C—D—E which for example may be amplitude modulated and which is assumed to be superimposed with a noise voltage so that the voltage before and after the pulse will not be zero. The amplitude of the channel pulse will thus be dependent upon the amplitude of the noise voltage and the relation between signal and noise on the relation between surface B—C—D—E and the surface B—E—H—G. If however according to this invention the voltage immediately before the pulse is supplied to a storage circuit and is then subtracted from the total voltage during the duration of the pulse, a considerably better relation will be achieved between signal and noise. This relation will be dependent on the relation between the area B—C—D—E and the area G—I—H. This last mentioned relation is as appears from the figure considerably greater than in the preceding case and will furthermore be independent of the amplitude of the noise voltage and only dependent upon its derivatives. If the derivative is near 0, i.e. if the frequency of the noise voltage is very low, the voltage will be practically eliminated during the duration of the pulse. This means that the area G—I—H then would be almost equal to 0. The improvement of the relation between signal and voltage is thus reciprocally proportional to the frequency of the noise voltage and to the duration of the channel pulse. If this duration be one microsecond and the frequency of the noise voltage be 3400 Hz. (i.e. the highest speech frequency to be transmitted in telephony) the invention affords a technical improvement of the relation between signal and noise having the magnitude of 40 db.

We claim:

1. A device for suppressing low frequency disturbances in a multiplex transmission system in which the signals in individual channels of the system are transmitted as combined series of modulated pulses interleaved in time with respect to one another, said device comprising a storage circuit means, means charging said storage circuit with an electric magnitude existing immediately prior to the appearance of each individual channel pulse in a combined pulse series, means maintaining said electric magnitude for a period of time short in relation to the time interval between two adjacent channel pulses belonging to different channels, and means for subtracting said stored electric magnitude from the electric energy of said combined pulse series, said subtracting means including two inputs, one of said inputs being fed with channel pulses and the other being connected to said one input by a circuit including in series said storage circuit means and an electronic switch means, and switch control means generating a gate pulse series synchronized with the channel pulse series to effect opening of the switch means immediately before the appearance of a channel pulse and closing of the switch means upon disappearance of said channel pulse.

2. A device according to claim 1 and further comprising a pulse amplitude modulator connected to be fed with said channel pulse series as a modulation voltage, a generator for generating gate pulses connected to said modulator, said gate pulses being of shorter duration than said channel pulses and appearing immediately before each channel pulse, and circuit means connected to the output of said modulator, said latter circuit means including a storage circuit for lengthening the duration of said amplitude modulated pulses received from the output of said modulator, said pulse lengthening storage circuit causing the lengthened pulses to appear about simultaneously with the corresponding channel pulses, means for subtracting said lengthened pulses from the channel pulse series, and regulating means for varying the pulse output of said circuit means connected to the modulator and to said subtracting means to suppress low frequency disturbances.

3. A device according to claim 1 wherein said storage circuit comprises a time delay network delaying the channel pulse series for a period of time less than the duration of the individual channel pulses.

4. A device according to claim 3 and further comprising amplitude limiting means connected in the device anterior of said time delay network.

5. A device according to claim 3 and further comprising time selective means for blocking the input of said delay network during the duration of a channel pulse fed to said time selective means, said time selective means being connected in the device anterior of said time delay network.

References Cited in the file of this patent

UNITED STATES PATENTS

| | | |
|---|---|---|
| 2,418,116 | Grieg | Apr. 1, 1947 |
| 2,419,292 | Shepard | Apr. 22, 1947 |
| 2,579,071 | Hansell | Dec. 18, 1951 |
| 2,580,421 | Guanella | Jan. 1, 1952 |
| 2,616,976 | Staal | Nov. 4, 1952 |
| 2,740,893 | Goldberg | Apr. 3, 1956 |
| 2,870,259 | Norris | Jan. 20, 1959 |